H. W. GOODALL & W. S. FEENY.
HOSE COUPLING.
APPLICATION FILED JAN. 3, 1916.
1,249,380.
Patented Dec. 11, 1917.
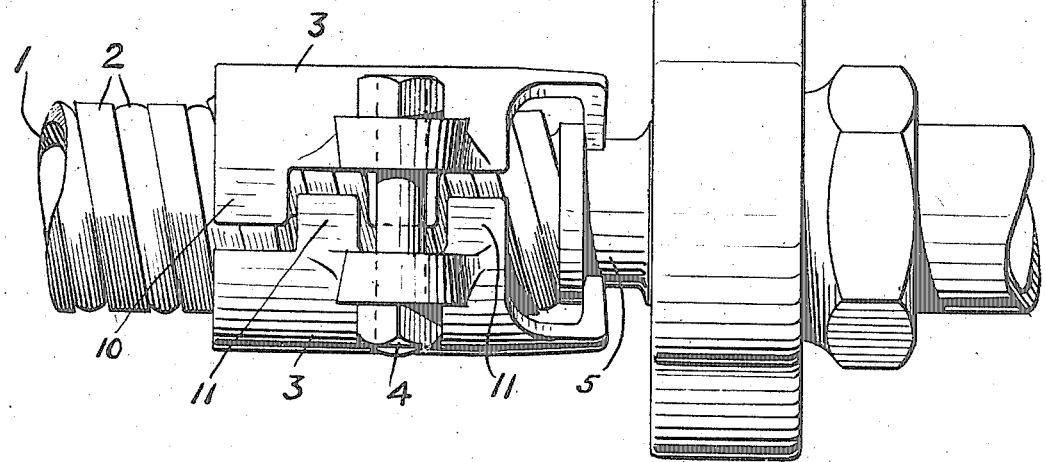
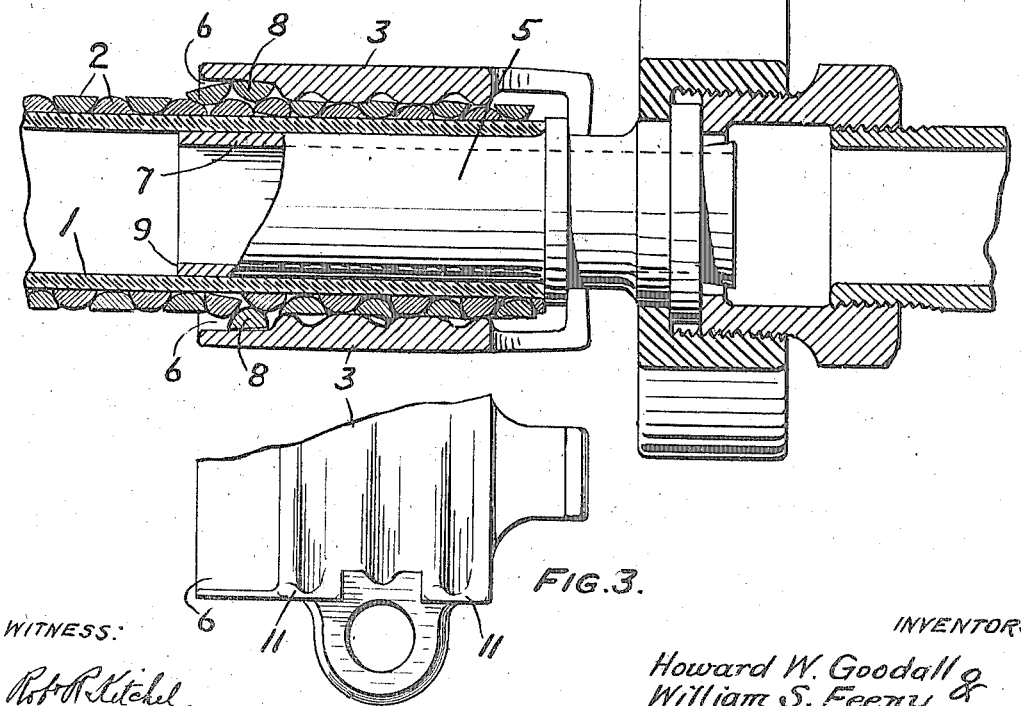
WITNESS:
Rob't R. Kitchel
INVENTORS
Howard W. Goodall &
William S. Feeny
BY
Augustus B. Stoughton
ATTORNEY.

UNITED STATES PATENT OFFICE.

HOWARD W. GOODALL, OF ALDAN, AND WILLIAM S. FEENY, OF PHILADELPHIA, PENNSYLVANIA.

HOSE-COUPLING.

1,249,380. Specification of Letters Patent. Patented Dec. 11, 1917.

Application filed January 3, 1916. Serial No. 69,749.

*To all whom it may concern:*

Be it known that we, HOWARD W. GOODALL and WILLIAM S. FEENY, both citizens of the United States, and residing, respectively, at Aldan, Delaware county, Pennsylvania, and Philadelphia, Philadelphia county, Pennsylvania, have jointly invented certain new and useful Improvements in Hose-Couplings, of which the following is a specification.
The principal object of the present invention is to support the recoil-upset portion of the spirally wound metal cover of the hose, produced by the action of the clamps upon it, in such a way that it continues to properly reinforce the rubber part of the hose but without compressing it inward over the smaller end of the stem.

The invention will be claimed at the end hereof but will be first described in connection with the embodiment of it chosen for illustration in the accompanying drawing in which Figure 1, is an elevational view of a coupling embodying features of the invention, Fig. 2, is a longitudinal sectional view of the same, showing diagrammatically and perhaps in an exaggerated degree the position of the metal covering in order to bring out graphically the mode of operation, and Fig. 3, is a plan view of part of one of the clamps.

In the drawings there is illustrated a hose of which 1, is the rubber part and 2, is the spiral metallic winding constituting a cover for the rubber part. 3, are clamps which are drawn and held together by screw-bolts 4, and operate to clamp the hose in respect to the stem 5, the smaller and free end of which extends beyond the adjacent ends of the clamps. There is nothing new about the device as covered by the immediately preceding detail description of it, but the novelty will now be described. 6, is an enlarged annular open-ended chamber located at one end of the clamps and between them and an intermediate portion 7, of the stem 5, and the wall of which controls and supports the recoil-upsetting (shown at 8) of the spiral metal cover 2, and so holds the latter up to the rubber part 1, of the hose and not only supports it but also prevents undue compression of the rubber part 1, of the hose over the end wall 9, of the stem. The recoil-upsetting of the spiral metallic covering or winding 2, is due to the squeezing or radially contracting action between the clamps and stem, it being remembered that the rubber part 1, of the hose is compressible. In the absence of the chamber 6, this recoil-upsetting of spiral metallic winding would cause it to pull away from and no longer support the rubber part 1, of the hose, thus leaving the latter free to burst, and the recoil-upsetting would also react upon the rubber part of the hose and compress it inward over the end 9, of the stem, thereby weakening and probably cutting the rubber.

10 and 11, are groups of coöperating fingers projecting from the lateral edges of the clamps and they serve two purposes; first, they prevent relative end movement of the clamps during assemblage and until the bolts 4, have been adjusted and tightened, and second, they oppose bulging of any part of the hose between the meeting edges of the clamps.

What we claim is:

A coupling for spirally wound metal covered rubber hose consisting essentially of clamps and a stem extending beyond the ends of the clamps, and said coupling provided with an enlarged annular open-ended chamber located at one end of the clamps and between them and an intermediate portion of the stem and the wall of which is adapted to control the recoil-upsetting of the spiral metal cover and to hold the latter up to the rubber part of the hose and prevent undue compression of the rubber part of the hose over the end of the stem, substantially as described.

HOWARD W. GOODALL.
WILLIAM S. FEENY.